United States Patent
Kondo et al.

(10) Patent No.: US 7,068,475 B2
(45) Date of Patent: Jun. 27, 2006

(54) MAGNETIC HEAD HAVING A FLUX-GUIDE REGULATING FILM REGULATING A MAGNETIC DOMAIN OF A FLUX GUIDE

(75) Inventors: Reiko Kondo, Kawasaki (JP); Yutaka Shimizu, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 09/883,899

(22) Filed: Jun. 18, 2001

(65) Prior Publication Data

US 2002/0118493 A1 Aug. 29, 2002

(30) Foreign Application Priority Data

Feb. 27, 2001 (JP) .............................. 2001-052825

(51) Int. Cl.
*G11B 5/39* (2006.01)
(52) U.S. Cl. .................................................... 360/321
(58) Field of Classification Search ................ 360/321, 360/324.12, 327.3, 327.31, 327.32
See application file for complete search history.

(56) References Cited

U.S. PATENT DOCUMENTS

| 5,483,403 | A | * | 1/1996 | Voegeli ........................ 360/321 |
| 5,617,276 | A | * | 4/1997 | Takada et al. ................ 360/321 |
| 5,671,105 | A | * | 9/1997 | Sugawara et al. ............ 360/321 |
| 6,223,420 | B1 | * | 5/2001 | Lee et al. .................... 29/603.14 |
| 6,344,954 | B1 | * | 2/2002 | Redon et al. ............ 360/324.2 |
| 6,519,124 | B1 | * | 2/2003 | Redon et al. ............ 360/324.2 |
| 2001/0040777 | A1 | * | 11/2001 | Watanabe et al. ............ 360/321 |
| 2002/0034055 | A1 | * | 3/2002 | Seyama et al. ........ 360/324.11 |
| 2004/0141262 | A1 | * | 7/2004 | Takahashi et al. ....... 360/327.3 |

FOREIGN PATENT DOCUMENTS

| JP | 61280013 A | * | 12/1986 |
| JP | 61287025 A | * | 12/1986 |
| JP | 06325331 A | * | 11/1994 |
| JP | 07153036 A | * | 6/1995 |
| JP | 08-115511 | | 5/1996 |
| JP | 08153310 A | * | 6/1996 |
| JP | 08-339514 | | 12/1996 |
| JP | 10011721 A | * | 1/1998 |
| JP | 10-143821 | | 5/1998 |
| JP | 10241123 A | * | 9/1998 |
| JP | 11-120523 | | 4/1999 |
| JP | 2000-48325 | | 2/2000 |
| JP | 2000-76623 | | 3/2000 |
| JP | 2000-76628 | | 3/2000 |
| JP | 2000-113419 | | 4/2000 |
| JP | 2000-215415 | | 8/2000 |
| JP | 2000-228004 | | 8/2000 |
| WO | WO 97 16823 A1 | * | 5/1997 |

* cited by examiner

*Primary Examiner*—William J Klimowicz
(74) *Attorney, Agent, or Firm*—Greer, Burns & Crain, Ltd.

(57) ABSTRACT

A magnetic head is provided. The magnetic head comprises a magnetoresistance film, a flux guide, and a flux-guide regulating film. The flux guide guides a signal magnetic field from a magnetic recording medium to the magnetoresistance film. The flux-guide regulating film aligns magnetic domains of the flux guide into a single magnetic domain.

7 Claims, 12 Drawing Sheets

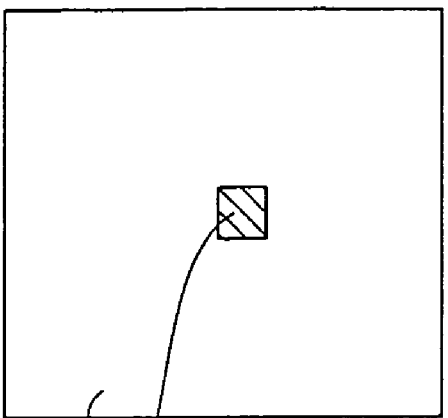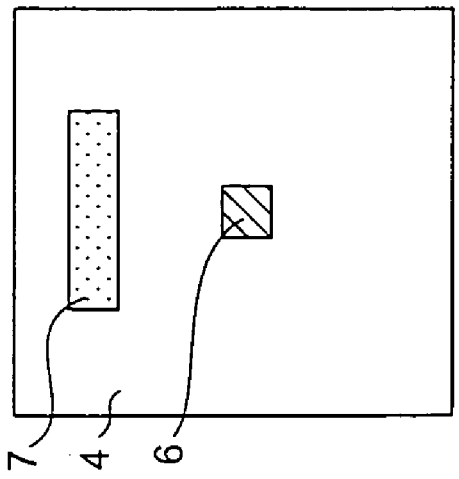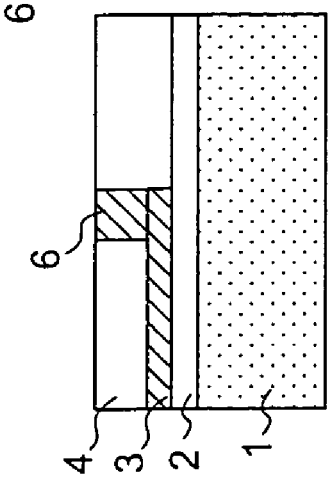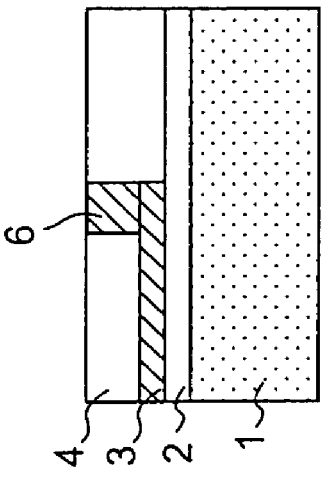
FIG. 3A     FIG. 3B
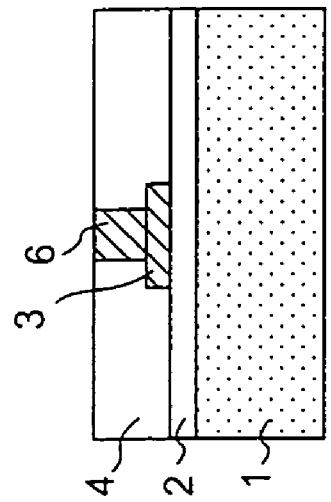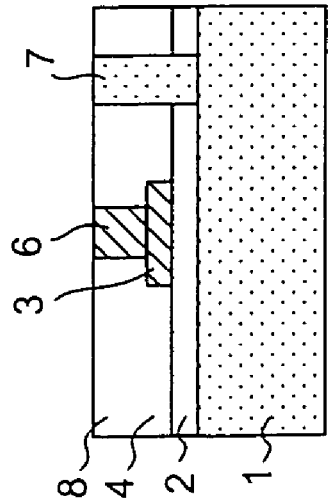

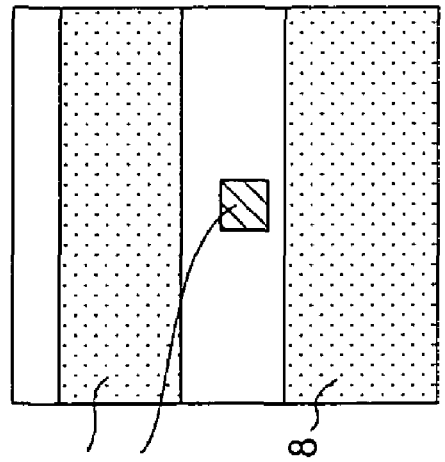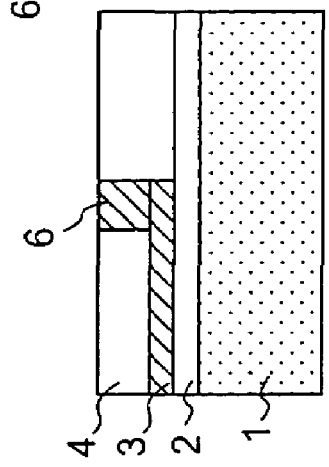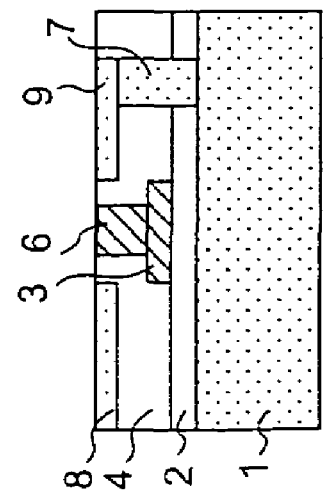
FIG. 4A
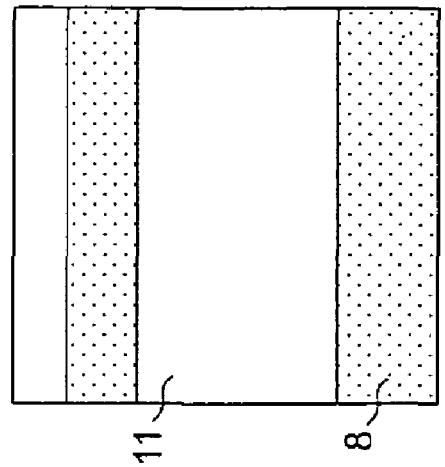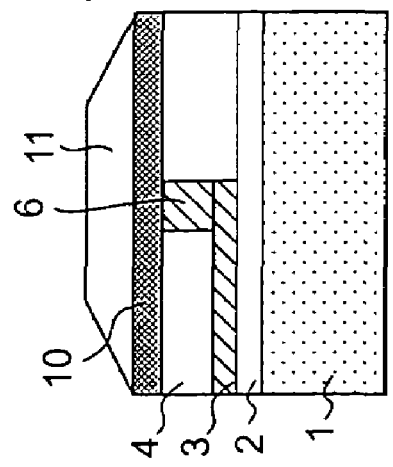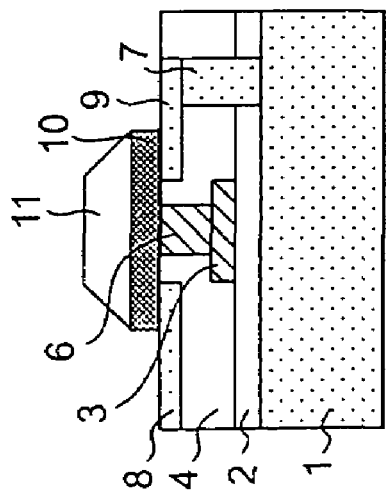
FIG. 4B

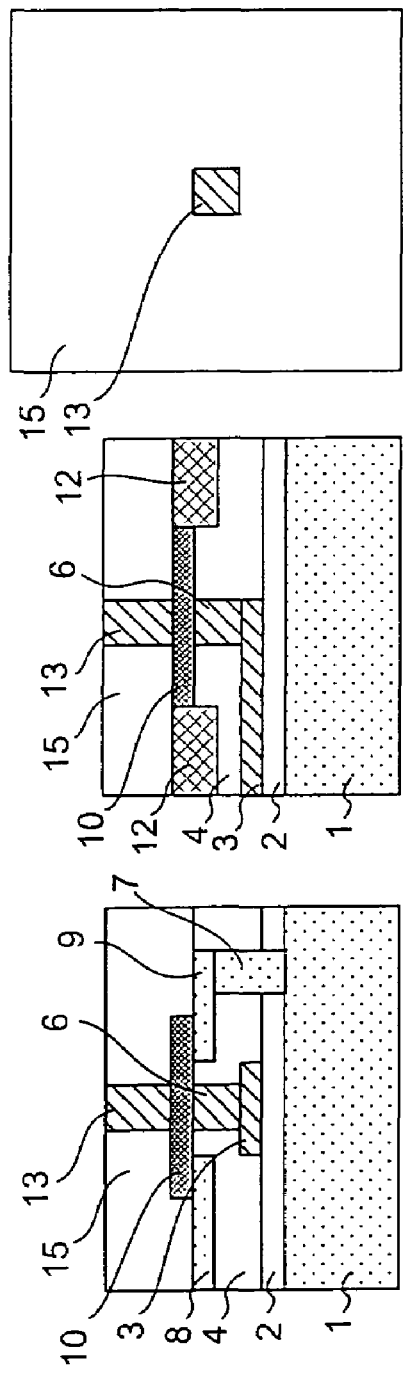
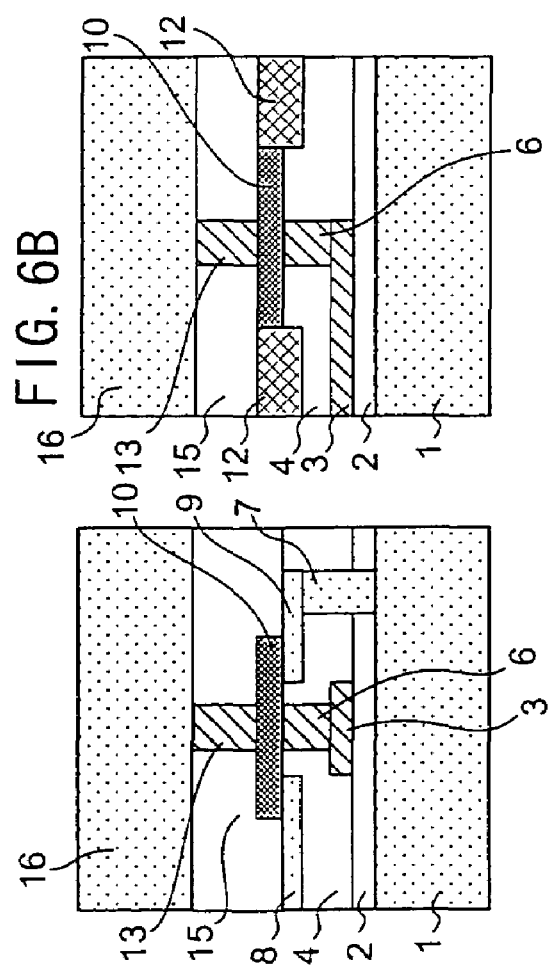
FIG. 6A
FIG. 6B

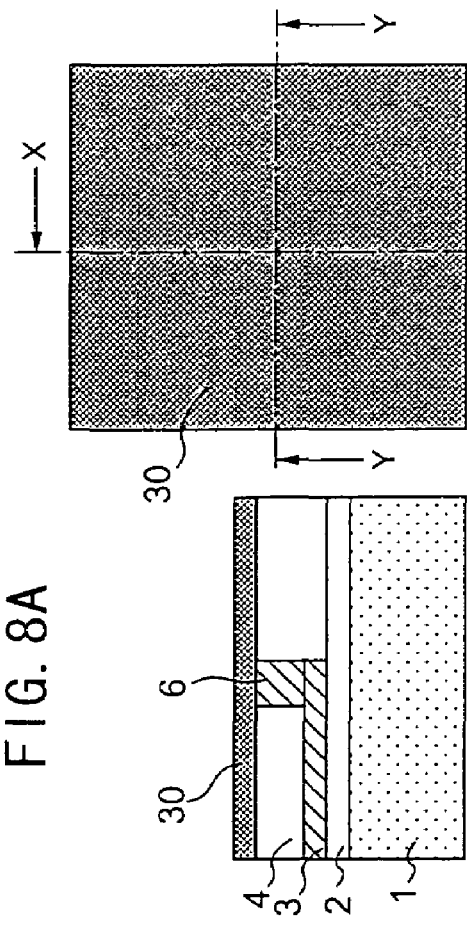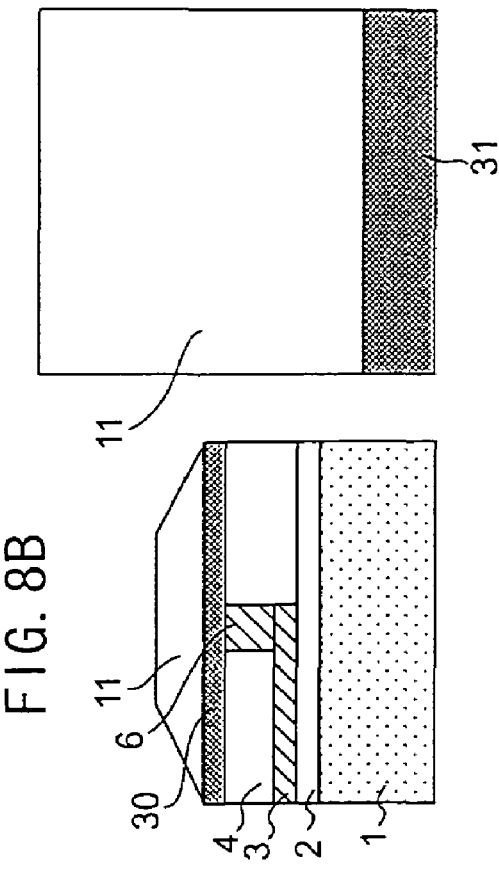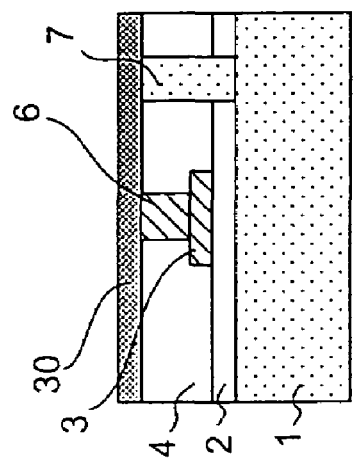
FIG. 8A
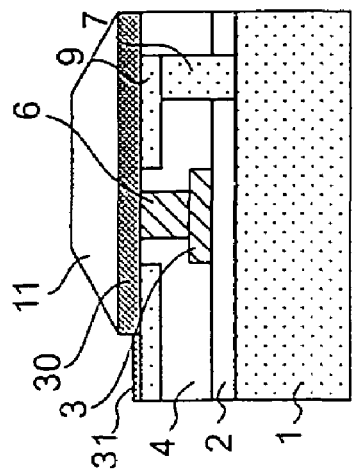
FIG. 8B

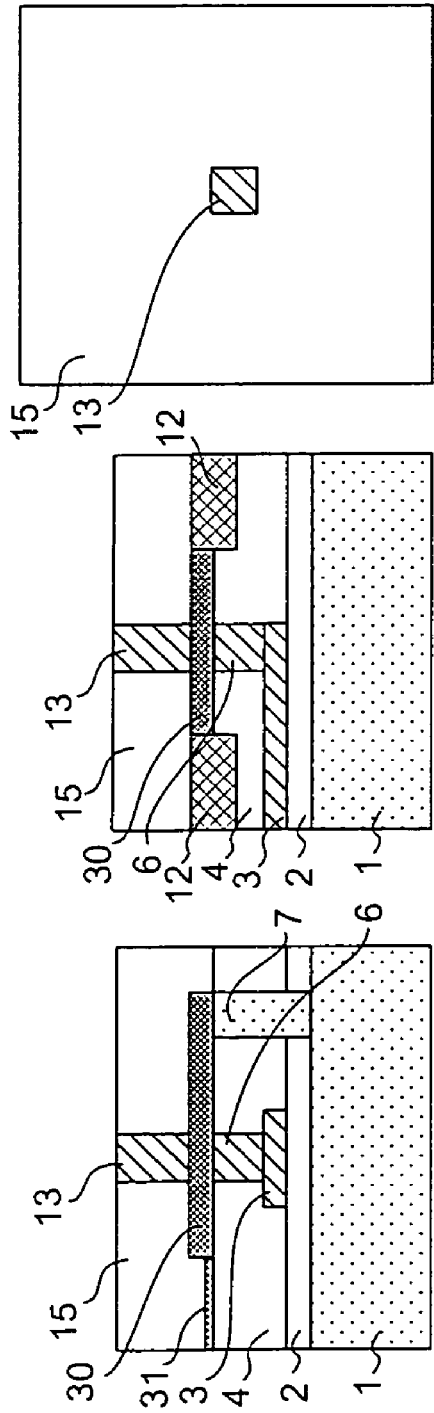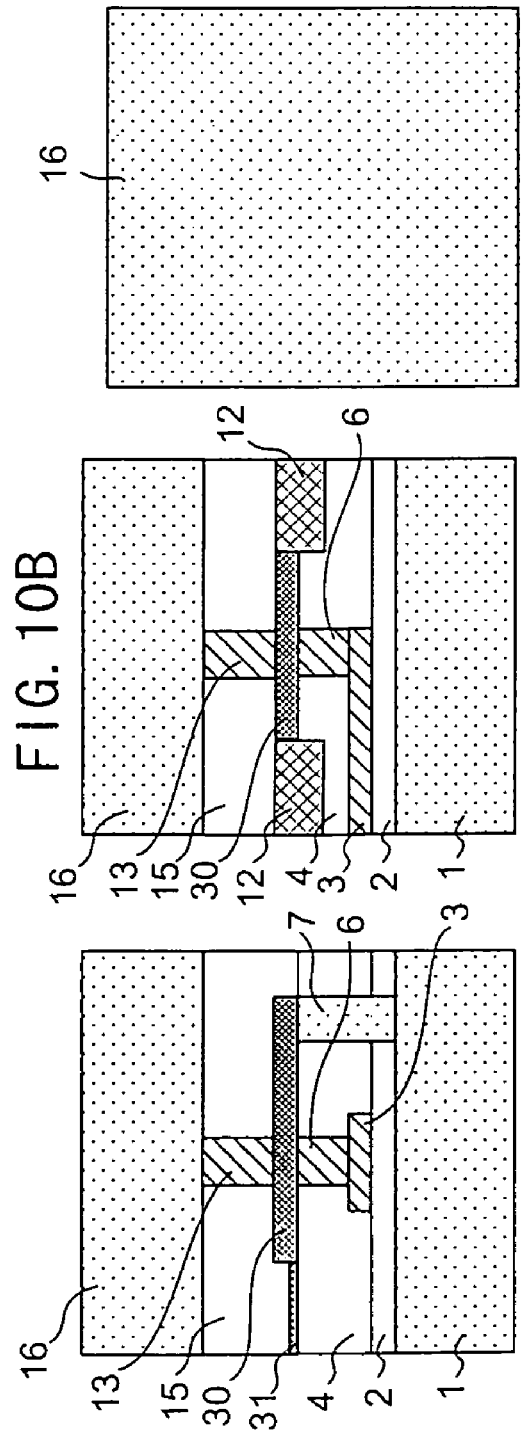

MAGNETIC HEAD HAVING A FLUX-GUIDE REGULATING FILM REGULATING A MAGNETIC DOMAIN OF A FLUX GUIDE

BACKGROUND OF THE INVENTION

1. Field of the Invention

The present invention generally relates to a magnetic head used in reproducing a signal magnetic field from a magnetic recording medium such as a hard disk, and, more particularly, to a magnetic head of a type which induces the signal magnetic field to a magnetoresistance film by utilizing a magnetic guidance path (hereinafter referred to as a flux guide) guiding the signal magnetic field.

2. Description of the Related Art

A magnetic head of a magnetoresistance type (hereinbelow referred to as an MR head) is a reproducing head using a magnetoresistance film (hereinbelow referred to as an MR film). A reproduction by the MR head does not depend on a relative speed between the MR head and a magnetic recording medium such as a magnetic disk. Therefore, the MR head is widely employed as a magnetic head which contributes to intensifying a recording density of a magnetic recording device and miniaturizing a magnetic recording device.

Recently, however, as such a magnetic recording device has come to have a mass capacity with a high recording density, a bit length and a track width on a magnetic recording medium have been sharply becoming small and narrow. Accordingly, a signal magnetic field from the magnetic recording medium has been reducing; therefore, the MR head for reproduction is needed to be more sensitive.

In order to provide the MR head with a higher sensitivity, magnetic domains of the MR film need to be aligned so as to form a single magnetic domain. If the magnetic domains of the MR film fail to be aligned sufficiently into a single magnetic domain, a Barkhausen noise occurs so as to greatly fluctuate the output being reproduced. To tackle this problem, the MR film is provided with a magnetic-domain regulating film to regulate a magnetic domain of the MR film. It is known that such a highly coercive-force film as CoPt or such an antiferromagnetic film as PdPtMn can be used as the magnetic-domain regulating film.

In addition, a CPP structure has been proposed as one of structures that are designed to provide the MR head with a higher sensitivity, in which CPP structure an electric current flows in the direction of thickness of the MR film so as to achieve a great resistance change.

Besides, as a magnetic recording device has come to have a higher recording density, an MR circuit has been becoming finer and finer. In this trend, a conventional process of directly polishing the MR circuit inevitably has a limitation in terms of accuracy, which makes it difficult to produce the MR circuit with a good yield rate. To tackle this problem, it has been proposed that a magnetic head be provided with a flux guide so that the MR circuit is not directly polished.

The heretofore-mentioned techniques to provide the MR head with a higher sensitivity can be combined to produce a further preferable magnetic head.

However, when the above-mentioned flux guide has multiple magnetic domains, magnetic movements occurring in these magnetic domains are transmitted to the MR film, since a signal magnetic field from a magnetic recording medium first passes this flux guide. This causes a problem that, even if magnetic domains of the MR film themselves are sufficiently regulated, a Barkhausen noise occurs so as to inhibit a good reproduction.

SUMMARY OF THE INVENTION

It is a general object of the present invention to provide an improved and useful magnetic head in which the above-mentioned problems are eliminated.

A more specific object of the present invention is to provide a magnetic head which can prevent noises so as to achieve a highly sensitive reproduction by aligning magnetic domains of a flux guide, as well as of an MR film, into a single magnetic domain.

In order to achieve the above-mentioned objects, there is provided according to one aspect of the present invention a magnetic head comprising:

a magnetoresistance film;

a flux guide guiding a signal magnetic field from a magnetic recording medium to the magnetoresistance film; and a flux-guide regulating film aligning magnetic domains of the flux guide into a single magnetic domain.

According to the present invention, magnetic domains of the flux guide are aligned into a single magnetic domain by the flux-guide regulating film. Thus, the magnetic head according to the present invention can inhibit the occurrence of a Barkhausen noise so as to reproduce a signal magnetic field from a magnetic recording medium with a high sensitivity.

Additionally, in the magnetic head according to the present invention, the flux guide may be formed as a separate element from the magnetoresistance film.

According to the present invention, the flux guide having desired magnetic characteristics can be formed by using properly selected materials.

Additionally, in the magnetic head according to the present invention, the flux guide may be formed as a part of the magnetoresistance film.

According to the present invention, the flux guide can be formed by using the magnetoresistance film. Therefore, a step of separately forming a flux guide becomes unnecessary.

Additionally, in the magnetic head according to the present invention, at least one of sides and surfaces of the flux-guide regulating film may be magnetically connected with the flux guide.

According to the present invention, magnetic connection of the flux-guide regulating film with the flux guide can be adjusted selectively.

Additionally, in the magnetic head according to the present invention, the flux-guide regulating film may be one of a highly coercive-force film and an antiferromagnetic film.

According to the present invention, the flux-guide regulating film can be so formed as to adequately regulate a magnetic domain of the flux guide.

Additionally, in the magnetic head according to the present invention, the flux-guide regulating film may also align magnetic domains of the magnetoresistance film into a single magnetic domain.

According to the present invention, the flux-guide regulating film also regulates a magnetic domain of the magnetoresistance film. This simplifies a structure and manufacturing steps of the magnetic head.

In addition, a different magnetic-domain regulating film may be formed separately to regulate a magnetic domain of the magnetoresistance film, in consideration of magnetic characteristics of materials forming the flux guide or magnetic characteristics of materials forming the magnetoresistance film.

Additionally, in the magnetic head according to the present invention, the magnetoresistance film may be a magnetoresistance film of one of a spin-valve type and a tunnel-junction type.

According to the present invention, with a huge magnetoresistance effect of the magnetoresistance film of the spin-valve type, the magnetic head according to the present invention can reproduce a signal magnetic field from a magnetic recording medium with a high sensitivity.

Furthermore, using the magnetoresistance film of the tunnel-junction type can make the magnetic head more sensitive. In this case, the magnetic head has a CPP structure.

In order to achieve the above-mentioned objects, there is also provided according to another aspect of the present invention a magnetic reproducing device comprising:

a magnetic head including:

a magnetoresistance film;

a flux guide guiding a signal magnetic field from a magnetic recording medium to the magnetoresistance film; and a flux-guide regulating film aligning magnetic domains of the flux guide into a single magnetic domain.

According to the present invention, the magnetic reproducing device can reproduce magnetic information recorded on the magnetic recording medium with a high sensitivity.

Other objects, features and advantages of the present invention will become more apparent from the following detailed description when read in conjunction with the accompanying drawings.

BRIEF DESCRIPTION OF THE DRAWINGS

FIG. 3A is a third illustration of the manufacturing steps of the MR head according to the first embodiment of the present invention;

FIG. 3B is a fourth illustration of the manufacturing steps of the MR head according to the first embodiment of the present invention;

FIG. 4A is a fifth illustration of the manufacturing steps of the MR head according to the first embodiment of the present invention;

FIG. 4B is a sixth illustration of the manufacturing steps of the MR head according to the first embodiment of the present invention;

FIG. 6A is a ninth illustration of the manufacturing steps of the MR head according to the first embodiment of the present invention;

FIG. 6B is a tenth illustration of the manufacturing steps of the MR head according to the first embodiment of the present invention;

FIG. 8A is a first illustration of manufacturing steps of the MR head according to the second embodiment of the present invention;

FIG. 8B is a second illustration of the manufacturing steps of the MR head according to the second embodiment of the present invention;

FIG. 10A is a fifth illustration of the manufacturing steps of the MR head according to the second embodiment of the present invention;

FIG. 10B is a sixth illustration of the manufacturing steps of the MR head according to the second embodiment of the present invention;

DETAILED DESCRIPTION OF THE PREFERRED EMBODIMENTS

A description will now be given, with reference to the drawings, of embodiments according to the present invention.

Figure 1:
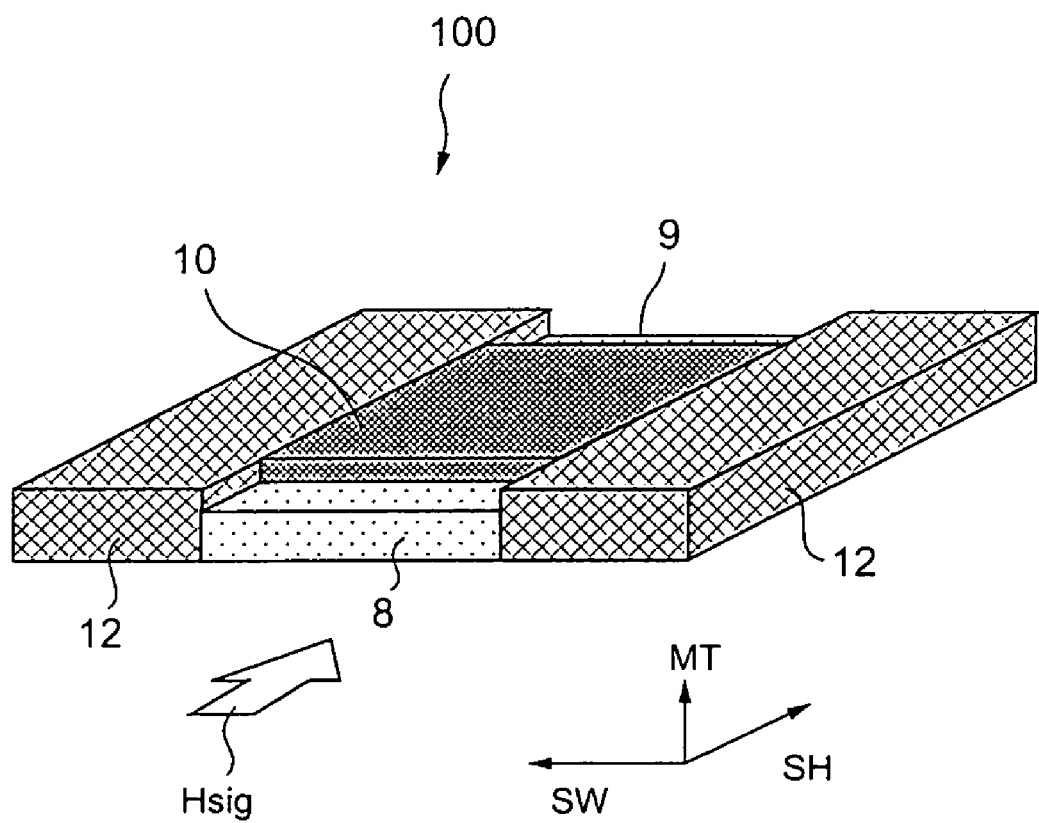
FIG. 1 is an illustration of a main structure of a magnetic head of a magnetoresistance type (an MR head) according to a first embodiment of the present invention.
Figure 2A:
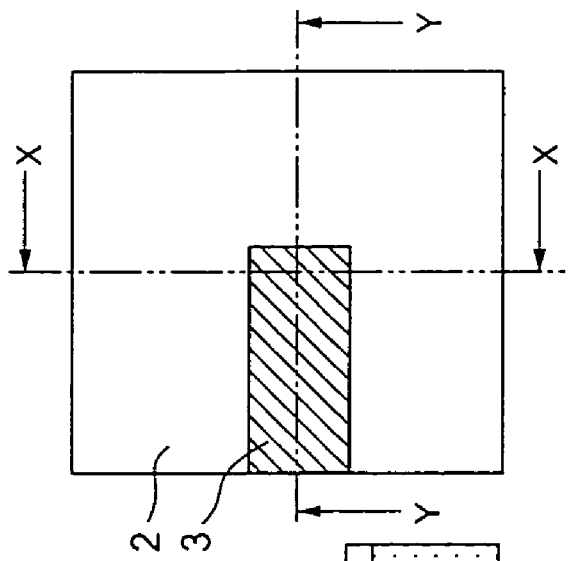
FIG. 2A is a first illustration of manufacturing steps of the MR head according to the first embodiment of the present invention.
Figure 2B:
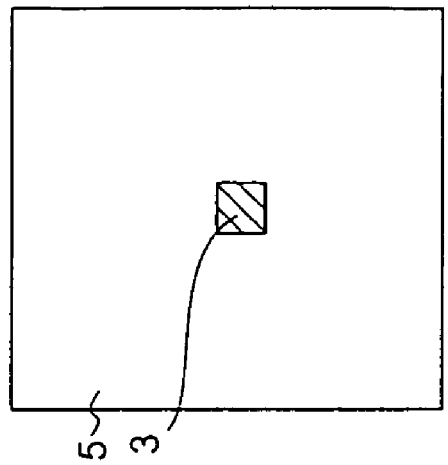
FIG. 2B is a second illustration of the manufacturing steps of the MR head according to the first embodiment of the present invention.

FIG. 1 is an illustration of a main structure of a magnetic head 100 of a magnetoresistance type (hereinbelow referred to as an MR head 100) according to a first embodiment of the present invention. In FIG. 1, such elements as electrode terminals are omitted from the drawing for the purpose of making it easy to show features of the MR head 100. A more detailed structure of the MR head 100 is make known hereinafter in explaining manufacturing steps of the MR head 100.

In FIG. 1, SW indicates the direction of width, SH indicates the direction of height, and MT indicates the direction of thickness. Hsig indicates a signal magnetic field from a magnetic recording medium.

In the MR head 100 according to the first embodiment, a flux-guide regulating film 12 regulating a magnetic domain of a flux guide 8 also functions as a magnetic-domain regulating film regulating a magnetic domain of a magnetoresistance film 10 (hereinbelow referred to as an MR film 10). The flux guide 8 and the MR film 10 of the MR head 100 according to the present embodiment are formed as separate elements.

In the present description, a regulating film regulating a magnetic domain of a flux guide is distinctively referred to as a "flux-guide regulating film", while a regulating film regulating a magnetic domain of an MR film is, as conventionally, referred to as a magnetic-domain regulating film.

A spin-valve MR film as a huge magnetoresistance film or a tunnel-junction MR film can be used as the MR film 10. The spin-valve MR film includes a spin-valve film of NiFe/Cu/NiFe/IrMn/etc. and a spin-valve film of a ferri-lamination type having a laminated structure of NiFe/Cu/CoFeB/Ru/CoFeB/PdPtMn. The tunnel-junction MR film includes a film of $NiFe/Al_2O_3/NiFe/PdPtMn$.

By the way, since the MR head 100 according to the present embodiment uses a flux guide, the signal magnetic field Hsig tends to diminish as compared to a magnetic head not having a flux guide. Therefore, the MR head 100 is preferred to employ a more sensitive MR film, especially the tunnel-junction MR film as the MR film 10, because the tunnel-junction MR film is highly sensitive. The tunnel-junction MR film requires a sensing current to flow in a perpendicular direction as to the surface thereof (the thickness direction MT); therefore, when the tunnel-junction MR film is used in the MR head 100, the MR head 100 has a CPP structure.

Hence, the MR head 100 according to the present embodiment is illustrated as a CPP type. It is noted that a spin-valve film can be also used in the MR head of a CPP type.

The flux guide 8 is formed on the side of the MR film 10 near to a magnetic recording medium in the height direction SH so as to be magnetically connected to the MR film 10. The flux guide 8 protrudes from the above-mentioned side of the MR film 10 in the height direction SH. The flux-guide regulating film 12 is provided so as to regulate the alignment of magnetic domains of the flux guide 8 into a single magnetic domain. The flux-guide regulating film 12 is formed on each side of the flux guide 8 in the width direction SW so as to be magnetically connected to the flux guide 8.

Additionally, the flux-guide regulating film 12 is extended in the height direction SH so as to be magnetically connected also to each side of the MR film 10 so that the flux-guide regulating film 12 also functions as the magnetic-domain regulating film for the MR film 10.

The MR head 100 according to the present embodiment regulates magnetic domains of the flux guide 8 and the MR film 10 by using a single regulating film. This arrangement simplifies the structure and manufacturing steps of the MR head 100. Of course, a magnetic-domain regulating film may be provided separately to regulate a magnetic domain of the magnetoresistance film 10.

Such a soft-magnetic material as NiFe can be used as the above-described flux guide 8. Such a highly coercive-force film as CoCrPt or such an antiferromagnetic film as PdPtMn can be used as the flux-guide regulating film 12.

The MR head 100 according to the present embodiment has a flux guide 9 on the opposite side to the flux guide 8 in the height direction SH, the flux guide 9 being for leading out a magnetic field. Functions of the flux guide 9 will be described hereinafter. In the following description, the flux guide 8 is referred to as a under flux guide 8, and the flux guide 9 is referred to as an upper flux guide 9. The (under) flux guide 8 is more closely associated with the present invention.

Next, a description will be given, with reference to FIG. 2A to FIG. 6B, of manufacturing steps of the above-described MR head 100. FIG. 2A to FIG. 6B show a series of the manufacturing steps of the MR head 100. In FIG. 2A to FIG. 6B, a figure on the right side is a view as seen from the thickness direction MT (from above in FIG. 1), a figure at the center is a cross-sectional view taken along line Y—Y in the width direction SW, and a figure on the left side is a cross-sectional view taken along line X—X in the height direction SH.

Hereinbelow, descriptions are given from FIG. 2A to FIG. 6B in order. First, in FIG. 2A, a shield 1 on a substrate, an insulating film 2 and an electrode terminal 3 are formed in this order. The electrode terminal 3 is so formed as not to be electrically connected to the shield 1. Next, in FIG. 2B, an insulating film 4 and a resist 5 are formed in this order, and then the resist 5 is patterned into a predetermined shape. This patterned resist 5 is used as a mask in etching the insulating film 4 by using such a method as an ion milling to form an opening on the upper side of the insulating film 4.

In FIG. 3A, an electrode terminal 6 is formed on the electrode terminal 3 in the above-mentioned opening before removing the resist 5. The resist 5 is removed thereafter. At this point, the electrode terminal 3 and the electrode terminal 6 are electrically connected to each other. As mentioned above, the MR head 100 according to the present embodiment has a CPP structure. The electrode terminal 3 and the electrode terminal 6 will become a under electrode of the MR film 10 that is to be formed subsequently.

In FIG. 3B, an opening is formed in the insulating film 2 and the insulating film 4 so as to form a flux path 7 therein, in the same manner as in forming the electrode terminal 6. The flux path 7 is so formed as to be magnetically connected to the shield 1. Although it is preferable that the flux path 7 contacts the shield 1, it does not matter whether or not the flux path 7 electrically connects to the shield 1, as long as the flux path 7 is so adjacent to the shield 1 as to magnetically connect thereto.

The flux path 7 has a function of connecting the shield 1 with the upper flux guide 9 that is to be formed in the following steps. Incorporating this structure facilitates the influx of the signal magnetic field Hsig from the under flux guide 8.

In FIG. 4A, the under flux guide 8 and the upper flux guide 9 are formed in the same manner as the flux path 7. In this step, the under flux guide 8 and the upper flux guide 9 are so formed as not to be electrically connected to the electrode terminals 3 and 6. Although it is preferable that the upper flux guide 9 contacts the flux path 7, it does not matter whether or not the upper flux guide 9 electrically connects to the flux path 7, as long as the upper flux guide 9 is so adjacent to the flux path 7 as to magnetically connect thereto.

Next, in FIG. 4B, the MR film 10 is formed by such a method as sputtering, and then a resist 11 is formed and patterned so as to be used as a mask in patterning the MR film 10 into a predetermined shape. In this course, the MR film 10 is formed so as to overlap a part of each of the under flux guide 8 and the upper flux guide 9. Although it is preferable that the MR film 10 contacts the surface of each of the under flux guide 8 and the upper flux guide 9, it does not matter whether or not the MR film 10 electrically connects to each of the under flux guide 8 and the upper flux guide 9, as long as the MR film 10 is so adjacent to each of the under flux guide 8 and the upper flux guide 9 as to magnetically connect thereto.

As mentioned above, a spin-valve MR film or a tunnel-junction MR film can be used as the MR film 10. The MR film 10 is so formed that the under flux guide 8 and the upper flux guide 9 have a free magnetic layer.

Figure 5A:
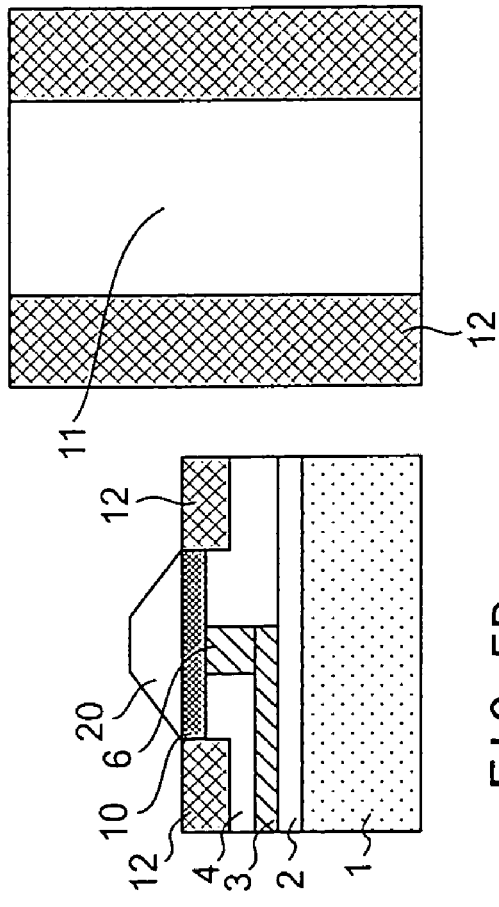
FIG. 5A is a seventh illustration of the manufacturing steps of the MR head according to the first embodiment of the present invention.

In FIG. 5A, a resist 20 is formed and patterned so as to be used as a mask in etching a part of the MR film 10 and parts of the under flux guide 8 and the upper flux guide 9. Then, the flux-guide regulating film 12 is formed by such a method as sputtering before removing the resist 20.

In this step, the flux-guide regulating film 12 is formed on each side of the under flux guide 8, the MR film 10 and the upper flux guide 9 so as to create a state in which the flux-guide regulating film 12 regulates magnetic domains of the under flux guide 8, the MR film 10 and the upper flux guide 9.

Next, the flux-guide regulating film 12 is patterned into a predetermined shape by using a resist, though not shown in the figures. At this point, as seen in the figure on the right side on FIG. 5B, it does not matter whether the upper end of the upper flux guide 9 is even with or below the upper end of the flux-guide regulating film 12, as long as the upper end of the upper flux guide 9 is not above the upper end of the flux-guide regulating film 12.

Figure 5B:
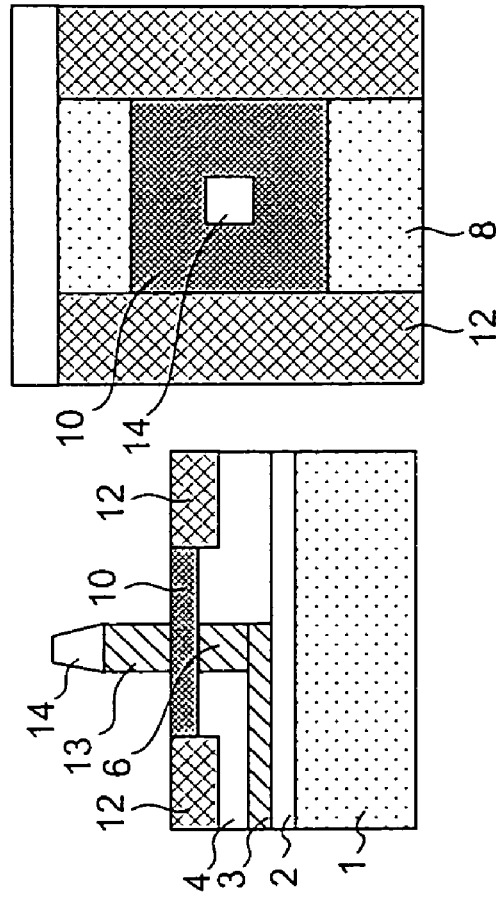
FIG. 5B is an eighth illustration of the manufacturing steps of the MR head according to the first embodiment of the present invention.

Next, in FIG. 5B, an electrode terminal 13 is formed, and then a resist 14 is formed and patterned so as to be used as a mask in patterning the electrode terminal 13.

Then, in FIG. 6A, an insulating film 15 is formed before removing the resist 14, and thereafter the resist 14 is removed. Finally, in FIG. 6B, a shield 16 is formed. At this point, the electrode terminal 13 and the shield 16 are electrically connected with each other. Since the electrode terminal 13 is formed on the MR film 10, the shield 16 becomes an upper electrode. The MR head 100 according to the present embodiment has a CPP structure in which the above-described electrode terminal 3 and the shield 16 are the electrodes formed under and on the MR film 10 so that a detecting current flows in the thickness direction MT.

The MR head 100 as shown in FIG. 1 is manufactured by the heretofore-mentioned manufacturing steps. In addition, in the above-mentioned steps, the shields 1 and 16 and the electrode terminals 3, 6 and 13 can be formed by such a method as plating, deposition or sputtering. The insulating films 2, 4 and 15 can be formed by such a method as sputtering.

Since the flux-guide regulating film 12 surely regulates the alignment of magnetic domains of the flux guide 8 into a single magnetic domain, the above-described MR head 100 can inhibit the occurrence of a Barkhausen noise and thus can reproduce a signal magnetic field from a magnetic recording medium with high sensitivity.

Figure 7:
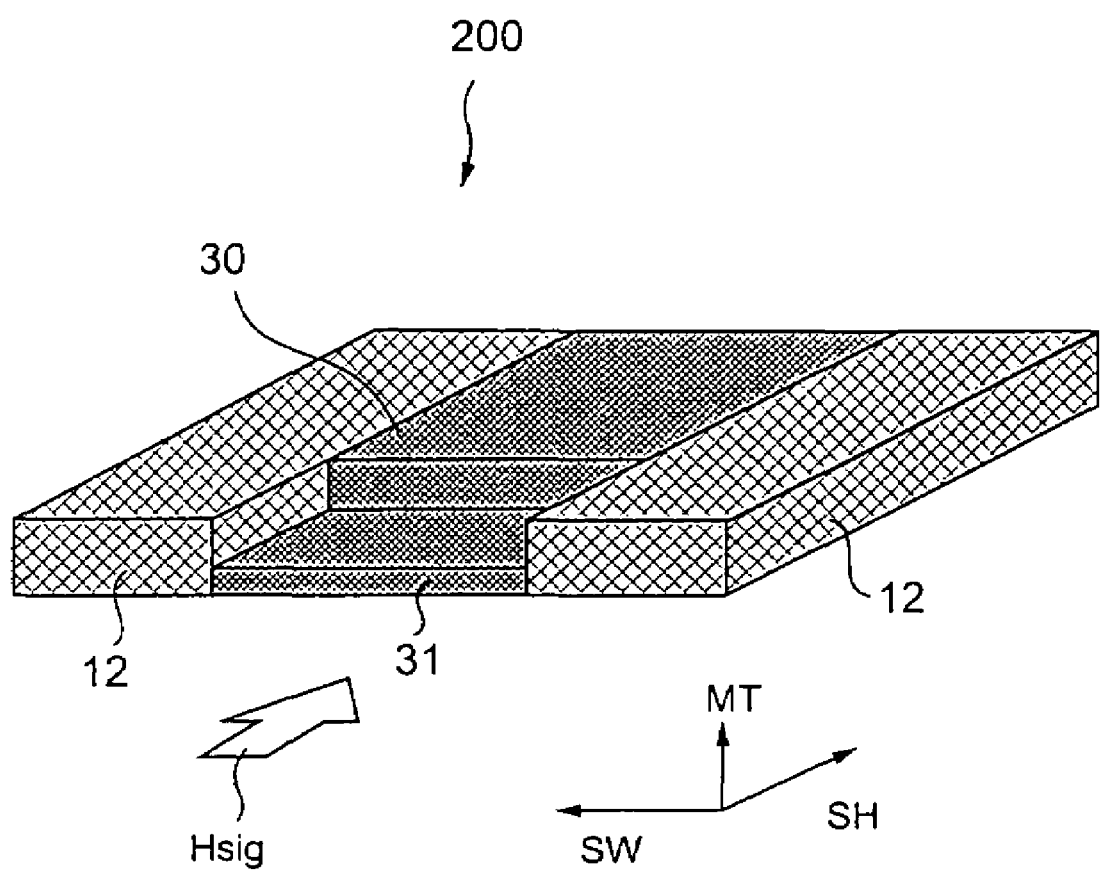
FIG. 7 is an illustration of a main structure of an MR head according to a second embodiment of the present invention.

FIG. 7 is an illustration of a main structure of an MR head 200 according to a second embodiment of the present invention. In FIG. 7, as in FIG. 1, such elements as electrode terminals are omitted from the drawing for the purpose of making it easy to show features of the MR head 200. A more detailed structure of the MR head 200 is make known hereinafter in explaining manufacturing steps of the MR head 200. Also in FIG. 7, SW indicates the direction of width, SH indicates the direction of height, MT indicates the direction of thickness, and Hsig indicates a signal magnetic field from a magnetic recording medium.

Also in the MR head 200 according to the second embodiment, the flux-guide regulating film also functions as a magnetic-domain regulating film regulating a magnetic domain of an MR film. However, in the MR head 200 according to the present embodiment, a flux guide is formed as a part of the MR film. It is noted here that elements in the second embodiment that are identical or equivalent to the elements described in first embodiment are referenced by the same reference marks, and will not be described in duplicate.

A spin-valve MR film as a huge magnetoresistance film or a tunnel-junction MR film can be used as an MR film 30 of the MR head 200 according to the present embodiment. The spin-valve MR film includes a spin-valve film of NiFe/Cu/NiFe/IrMn/etc. and a spin-valve film of a ferri-lamination type having a laminated structure of Ni/Cu/CoFeB/Ru/CoFeB/PdPtMn. The tunnel-junction MR film includes a film of NiFe/Al$_2$O$_3$/NiFe/PdPtMn. It is noted that the MR head 200 also has a CPP structure.

In the second embodiment, a flux guide 31 is formed as an extended part of the above-mentioned MR film 30. The MR head 200 according to the present embodiment does not need to have a flux guide on the opposite side to the flux guide 31 in the height direction SH for leading out a magnetic field. In the MR head 200 according to the present embodiment, the flux guide 31 is a part of the MR film 30, and the MR film 30 is so formed as to be magnetically connected to the flux path 7. Therefore, the MR head 200 can provide the same effect as the MR head 100 according to the first embodiment without having the upper flux guide 9.

Next, a description will be given, with reference to FIG. 8A to FIG. 10B, of manufacturing steps of the above-described MR head 200. The steps shown in FIG. 2A to FIG. 3B of the first embodiment are equivalent in the present embodiment. Therefore, the following description skips the steps equivalent to the steps shown in FIG. 2A to FIG. 3B, and starts with a step shown in FIG. 8A.

In FIG. 8A, the MR film 30 is formed because a material forming a flux guide does not have to be formed. The above-mentioned spin-valve MR film or the tunnel-junction MR film can be used as the MR film 30.

Next, in FIG. 8B, the resist 11 is formed and patterned so as to be used as a mask in patterning the MR film 30 into a predetermined shape having at least a free magnetic layer. It is noted that not only a nonmagnetic layer (Cu or Al$_2$O$_3$) on the free magnetic layer but also a part of a pinned magnetic layer on the nonmagnetic layer may be left as a part of the MR film 30.

In this step, the flux guide 31 is formed as an extended part of the MR film 30.

Figure 9A:
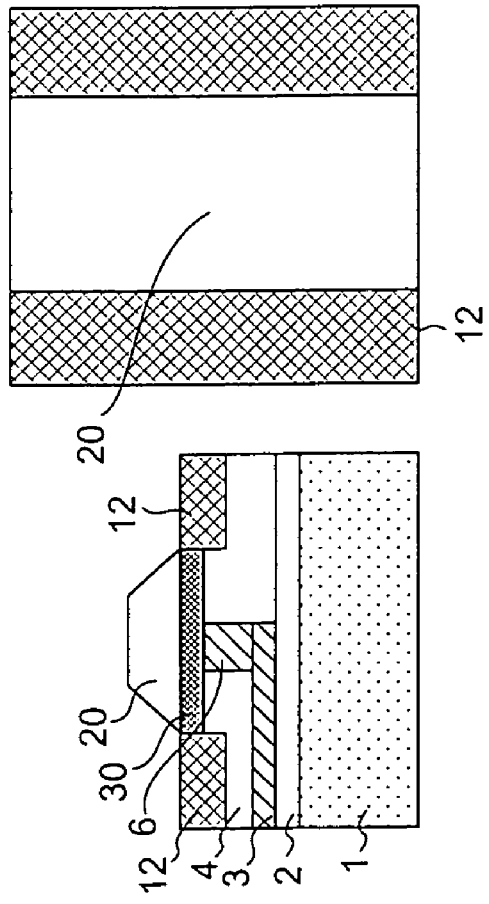
FIG. 9A is a third illustration of the manufacturing steps of the MR head according to the second embodiment of the present invention.

In FIG. 9A, the resist 20 is formed and patterned so as to be used as a mask in etching the MR film 30. Thereafter, the flux-guide regulating film 12 is formed by such a method as sputtering before removing the resist 20. In this step, the flux-guide regulating film 12 is formed on each side of the MR film 30 including the flux guide 31.

Next, the flux-guide regulating film 12 is patterned into a predetermined shape by using a resist, though not shown in the figures. At this point, as seen in the figure on the right side on FIG. 9B, it does not matter whether the upper end of the flux-guide regulating film 12 is even with or above the upper end of the MR film 30, as long as the upper end of the flux-guide regulating film 12 is not below the upper end of the MR film 30.

Figure 9B:
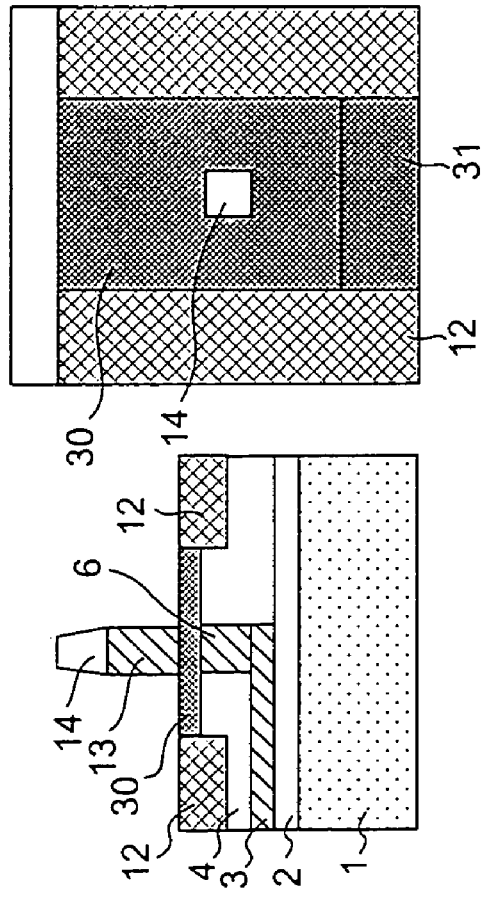
FIG. 9B is a fourth illustration of the manufacturing steps of the MR head according to the second embodiment of the present invention.

Next, in FIG. 9B, the electrode terminal 13 is formed, and then the resist 14 is formed and patterned so as to be used as a mask in patterning the electrode terminal 13.

Then, in FIG. 10A, the insulating film 15 is formed before removing the resist 14, and thereafter the resist 14 is removed. Finally, in FIG. 10B, the shield 16 is formed. At this point, the electrode terminal 13 and the shield 16 are electrically connected with each other. The MR head 200 according to the present embodiment also has a CPP structure.

Since the flux-guide regulating film 12 surely regulates magnetic domains of the flux guide 31 formed as a part of the MR film 30, the above-described MR head 200 can reproduce a signal magnetic field from a magnetic recording medium with high sensitivity.

According to the second embodiment, the flux guide is formed as a part of the MR film 30, and thus a step of separately forming a flux guide is unnecessary. This simplifies the manufacturing steps of the MR head.

Figure 11A:
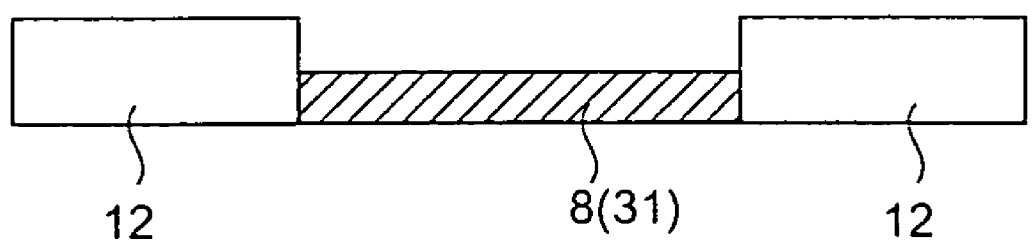
FIG. 11A to FIG. 11C are illustrations showing styles of connection of a flux-guide regulating film with a flux guide.
Figure 11B:
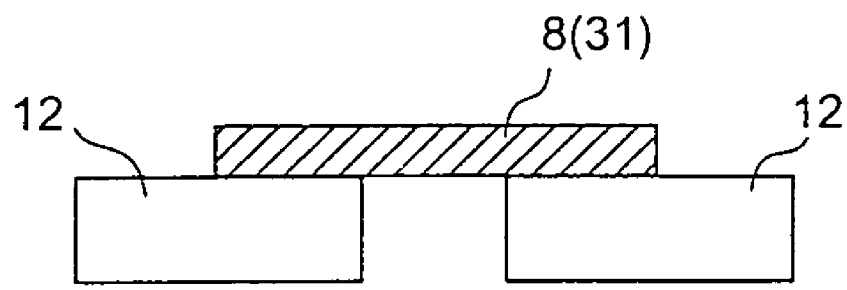

In the heretofore-described first and second embodiments, the flux-guide regulating film 12 is formed on each side of the flux guide 8 (31), as shown in FIG. 11A. However, the style of magnetic connection of the flux-guide regulating film 12 with the flux guide 8 (31) is not limited to this. For example, the outer surface of the flux-guide regulating film 12 may be connected to the inner surface of the flux guide 8 (31), as shown in FIG. 11B. Further, the flux-guide regulating film 12 may be connected to the inner surface and each side of the flux guide 8 (31), as shown in FIG. 11C.

In order to provide the style of magnetic connection shown in FIG. 11B, the step shown in FIG. 5A can be so changed that the flux-guide regulating film 12 is formed and processed before etching the under flux guide 8. Also, in order to provide the style of magnetic connection shown in FIG. 11C, the step shown in FIG. 5A can be so changed that the flux-guide regulating film 12 is formed and etched before forming the under flux guide 8.

Figure 11C:
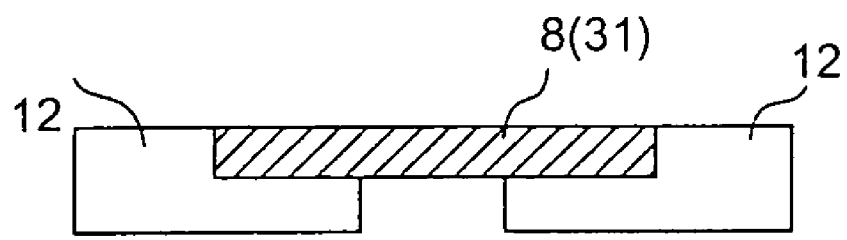

Since the styles of magnetic connection shown in FIG. 11B and FIG. 11C enable closer magnetic connection of the flux-guide regulating film with the flux guide, the flux-guide regulating film can more surely regulate magnetic domains of the flux guide.

In the above-described first and second embodiments, the flux-guide regulating film also functions as a magnetic-domain regulating film regulating a magnetic domain of the MR film. However, the present invention is not limited to these embodiments, and another magnetic-domain regulating film may be formed separately to regulate the magnetic domain of the MR film.

Although each of the above-described first and second embodiments is described as the MR head that can reproduce a signal magnetic field from a magnetic recording medium with high sensitivity, it is clear that the MR head along with a conventional inductive thin-film head can make a recording and reproducing head.

Figure 12:
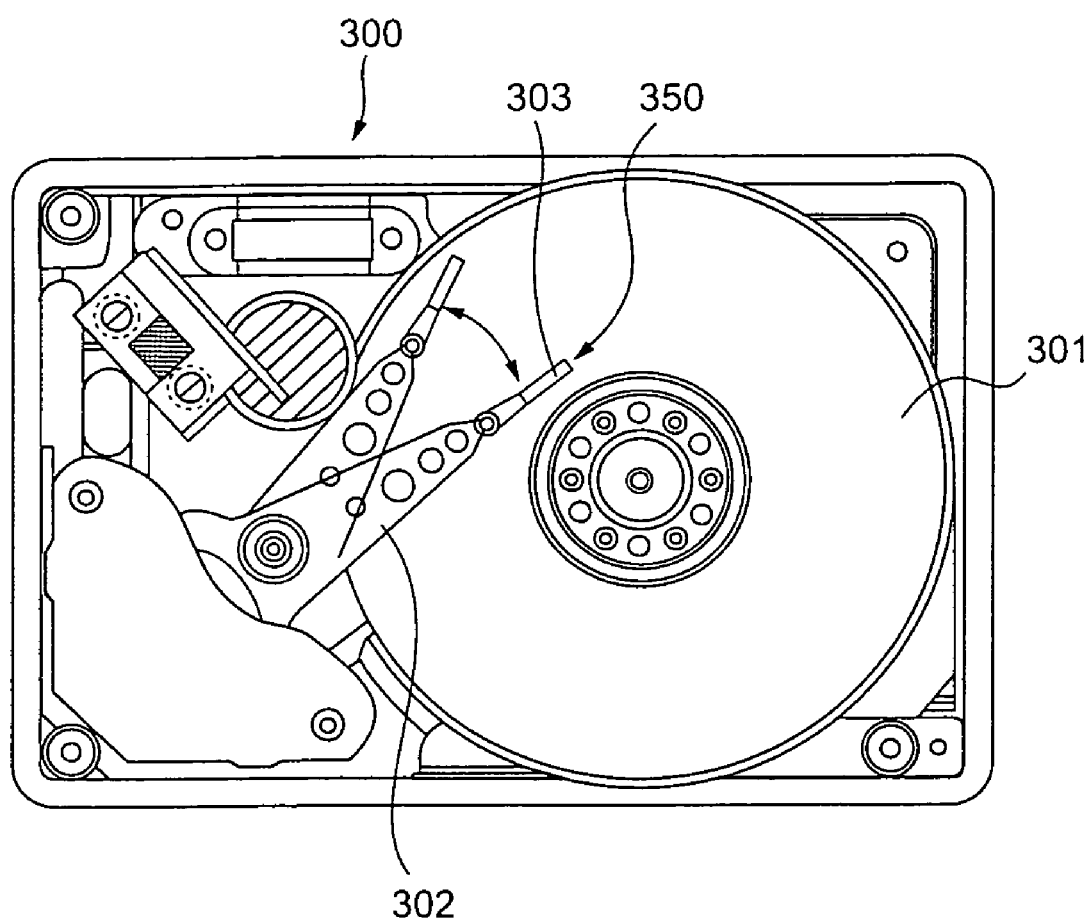
FIG. 12 is an illustration of a main structure of a recording and reproducing device for a magnetic recording medium.

Next, a description will be given of a recording and reproducing device for a magnetic recording medium, the recording and reproducing device having the MR head according to the above-mentioned embodiments mounted therein. FIG. 12 is an illustration of a main structure of the recording and reproducing device. A recording and reproducing device 300 for a magnetic recording medium has a hard disk 301 mounted therein as a magnetic recording medium that is caused to rotate. A complex magnetic head 350 includes, for example, the MR head 100 according to the first embodiment facing the surface of the hard disk 301 for reproducing with a predetermined distance therebetween. The complex magnetic head 350 is used to perform a magnetic reproduction. The complex magnetic head 350 is fixed on the tip of a slider 303 at the end of an arm 302. The complex magnetic head 350 can be positioned by using a two-stage actuator combining a normal actuator and an electromagnetic tremor actuator.

Although the magnetic recording and reproducing device shown in FIG. 12 uses the MR head 100 according to the first embodiment, the magnetic recording and reproducing device may also employ the MR head 200 according to the second embodiment of the present invention.

The present invention is not limited to the specifically disclosed embodiments, and variations and modifications may be made without departing from the scope of the present invention.

The present application is based on Japanese priority application No. 2001-052825 filed on Feb. 27, 2001, the entire contents of which are hereby incorporated by reference.

What is claimed is:

1. A magnetic head comprising:
   a magnetoresistance film;
   a flux guide guiding a signal magnetic field from a magnetic recording medium through said magnetoresistance film, wherein said signal magnetic field in said flux guide is in the same general direction as said signal magnetic field of said magnetoresistance film, wherein a part of a surface of the magnetoresistance film overlaps and contacts a part of a surface of the flux guide, and wherein the surface of the magnetoresistance film is not an edge of the magnetoresistance film and the surface of the flux guide is not an edge of the flux guide; and
   a flux-guide regulating film aligning magnetic domains of said flux guide into a single magnetic domain.

2. The magnetic head as claimed in claim 1, wherein said flux guide is formed as a separate element from said magnetoresistance film.

3. The magnetic head as claimed in claim 1, wherein at least one of sides and surfaces of said flux-guide regulating film is magnetically connected with said flux guide.

4. The magnetic head as claimed in claim 1, wherein said flux-guide regulating film is one of a highly coercive-force film and an antiferromagnetic film.

5. The magnetic head as claimed in claim 1, wherein said flux-guide regulating film also aligns magnetic domains of said magnetoresistance film into a single magnetic domain.

6. The magnetic head as claimed in claim 1, wherein said magnetoresistance film is a magnetoresistance film of one of a spin-valve type and a tunnel-junction type.

7. A magnetic reproducing device comprising:
   a magnetic head including:
   a magnetoresistance film;
   a flux guide guiding a signal magnetic field from a magnetic recording medium through said magnetoresistance film, wherein said signal magnetic field in said flux guide is in the same general direction as said signal magnetic field of said magnetoresistance film, a part of a surface of the magnetoresistance film overlaps and contacts a part of a surface of the flux guide, and the surface of the magnetoresistance film is not an edge of the magnetoresistance film and the surface of the flux guide is not an edge of the flux guide; and
   a flux-guide regulating film aligning magnetic domains of said flux guide into a single magnetic domain.

* * * * *